(12) United States Patent
Lu et al.

(10) Patent No.: US 10,224,800 B2
(45) Date of Patent: Mar. 5, 2019

(54) LOAD CURRENT DETECTION TECHNIQUES FOR DISCONTINUOUS CONDUCTION MODE

(71) Applicant: Analog Devices Global, Hamilton (BM)

(72) Inventors: Danzhu Lu, Shanghai (CN); Bin Shao, Andover, MA (US)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/618,270

(22) Filed: Jun. 9, 2017

(65) Prior Publication Data

US 2018/0358884 A1 Dec. 13, 2018

(51) Int. Cl.
*H02M 1/08* (2006.01)
*H02M 3/156* (2006.01)
*H02M 1/00* (2006.01)

(52) U.S. Cl.
CPC .............. *H02M 1/08* (2013.01); *H02M 3/156* (2013.01); *H02M 2001/0009* (2013.01)

(58) Field of Classification Search
CPC .... H02M 3/156–3/158; H02M 3/1588; H02M 1/08; Y02B 70/1466
USPC ......................................... 323/222, 232, 247
See application file for complete search history.

(56) References Cited

U.S. PATENT DOCUMENTS

| 9,564,810 B2* | 2/2017 | Teo .................... H02M 3/33507 |
| 9,831,767 B2* | 11/2017 | Suryanarayana ..... H02M 3/156 |
| 2015/0263614 A1* | 9/2015 | Bansal ............... G01R 19/2506 |
| | | 323/282 |
| 2016/0072384 A1* | 3/2016 | Fan ....................... H02M 3/156 |
| | | 323/282 |

OTHER PUBLICATIONS

Shao, Bin, "A Novel Low Quiescent Current PFM Method with independent Threshold for Buck Switching Converters", 4 pgs.
Xu, Weiwei, et al., "A Dual-Mode Single-Inductor Dual-Output Switching Converter With Small Ripple", IEEE Transactions on Power Electronics, vol. 25, No. 3, Mar. 2010, (Mar. 1, 2010), 614-623.

* cited by examiner

*Primary Examiner* — Yemane Mehari
(74) *Attorney, Agent, or Firm* — Schwegman Lundberg & Woessner, P.A.

(57) ABSTRACT

Techniques for indicating a load level of a DC-DC switching converter are provided. IN an example, a method for real-time load current detection for a switching converter using a discontinuous conduction mode (DCM) of operation can include generating a minimum DCM current threshold based on an reference current source and a duty cycle of the switching converter, receiving a representation of inductor charge current from power switch of the switching converter at a comparator, comparing the representation to the DCM current threshold, and controlling the power switch using a discontinuous conduction mode of the switching converter when a peak of the representation exceeds the minimum DCM current threshold.

20 Claims, 4 Drawing Sheets

LOAD CURRENT DETECTION TECHNIQUES FOR DISCONTINUOUS CONDUCTION MODE

BACKGROUND

Many electrical devices can include a voltage converter to step up or step down a DC voltage to an operating voltage of the device. Efficiency can be a criteria for determining when a particular converter control method should be used. Discontinuous conduction mode (DCM) operation of a converter can be very efficient over a range of loads. However, for very light loads, the efficiency of DCM can begins to fall significantly.

OVERVIEW

Techniques for indicating a load level of a DC-DC switching converter are provided. In an example, a method for real-time load current detection for a switching converter using a discontinuous conduction mode (DCM) of operation can include generating a minimum DCM current threshold based on an reference current source and a duty cycle of the switching converter, receiving a representation of inductor charge current from power switch of the switching converter at a comparator, comparing the representation to the DCM current threshold, and controlling the power switch using a discontinuous conduction mode of the switching converter when a peak of the representation exceeds the minimum DCM current threshold.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized apparatus and methods for providing a load threshold signal for a DC-DC converter. In certain applications, the load threshold signal can be used to transition a converter from DCM control to another more efficient control scheme. A conventional techniques for detecting a converter load level can suffer from significant dependence on input voltage conditions and inductance variation of the converter. Some conventional techniques can require a switching cycle delay before providing a reliable load level detection signal. In general, for each switching cycle of a switching regulator, the charge current in inductor is the peak current of the inductor multiplied by half the duty cycle and the discharge current is the load current. In stable state, the charge current is equal to discharge current such that $$I_{peak} = \frac{2 * I_{load}}{D}, \qquad \text{Eq. 1}$$

where $I_{peak}$ is the peak current of a switch cycle in a DCM-type control mode, $I_{load}$ is the load current and D is the duty cycle of the switch cycle. In certain examples, the above formula provides a basis for providing a peak threshold generator that can assist in detecting the load level of a switching regulator independent of input voltage, output voltage and inductance, and can provide immediate results to change operation of the regulator from DCM control to a more efficient control scheme during periods of very light loads. In certain applications, the DCM peak threshold discussed below can allow for accurate detection of the load level without the conventional switch cycle delay. Such a detection capability can allow a device to more quickly transition to more efficient control schemes which can prolong operation of mobile devices between charge cycles where supply power of the device is limited via a battery or some other limited capacity power supply.

Figure 1:
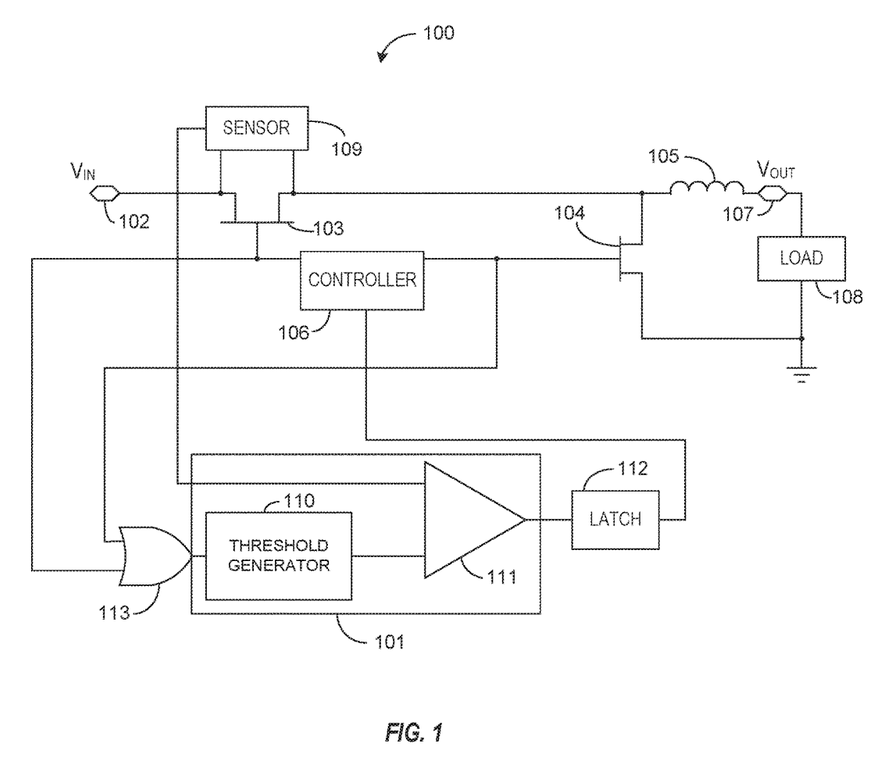
FIG. 1 illustrates generally a voltage converter with an example load-check circuit.

FIG. 1 illustrates generally a voltage converter 100 with an example load-check circuit 101. In certain examples, the voltage converter can include a supply input 102 to receive an input voltage ($V_{IN}$), a first power switch 103, a second power switch 104, an inductor 105, a control circuit 106 and an output 107 to supply an output voltage ($V_{OUT}$) to a load 108. In certain examples, the load check circuit 101 can include a threshold generator 110, and a comparator 111. In certain examples, the output of the load-check circuit 101 can be used as an input to the control circuit 106 to change a control scheme of the switches 103, 104 of the converter 100. In general, the voltage converter 100 can receive input voltage ($V_{IN}$) and can provide the output voltage (your) to the load 108. The output voltage ($V_{OUT}$) can be at a different voltage level of the input voltage ($V_{IN}$). The control circuit 106 can include logic to control the first and second power switches 103, 104 so that the output voltage ($V_{OUT}$) is maintained at a certain voltage level. There are several conventional control schemes for switching the first and second power switches 103, 104 to maintain a desired voltage level ($V_{OUT}$) at the load 108.

In certain examples, the load check circuit 101 can receive an indication of the current passed by the first power switch 103 and an indication of a duty cycle of the first power switch 103 and/or the second power switch 104 and can generate an output indicative of a load level of the voltage converter 100. In certain examples, a current sensor 109 can provide an indication of current passing by the first power switch 103 to a first input of the load check circuit 101. Optional duty cycle logic 113 can provide an indication of the duty cycle of the first power switch 103 and/or the second power switch 104 to a second input of the load check circuit 101. The threshold generator 110 can provide one or more thresholds to a comparator 111. In a first mode of operation, the threshold generator 110 can provide a peak current threshold. The comparator 111, in the first mode of operation, can provide an indication of the converter 100 operating with a first transistor current that exceeds the peak current threshold. In the first mode of operation, the control circuit 106 can take action to reduce stress of the converter 100 when the comparator output indicates that the converter 100 is operating with a first transistor current that exceeds the peak current threshold. Such action can include limiting the switching duty cycle of the first or second power switches 103, 104 to lower the peak current, disabling one or more of the power switches 103, 104, or other actions to reduce the current passed by the voltage converter 100.

In a second mode of operation, the threshold generator 110 and the comparator 111 can provide a load level threshold of the converter 100 using the current detected by the current sensor 109 and the duty cycle information provided by the duty cycle logic 113. The load level threshold and corresponding output provided by the load check circuit 101 can allow the control circuit 106 to switch control strategies of the first and second power switches 103, 104 to more efficiently operate the voltage converter 100. For example, in the second mode of operation, the threshold generator 110 can provide a load level threshold that depends on the duty cycle of the power switches 103, 104 and a reference current. When operating in a discontinuous conduction mode (DCM), the voltage converter 100 can provide efficient operation when the load level of the voltage converter 100 is above a minimum load level. Once the load level reduces below the minimum load level, other control schemes can provide more efficient voltage conversion. In the second mode of operation, the threshold generator 110 can provide a load level indicator to allow the control circuit 106 to switch to the more efficient mode of operation of the voltage converter 100. In certain examples, the output of the load check circuit 101 can be coupled to a latch 112. As discussed above, the load level is related to the duty cycle and the maximum level of the peak charge current of the voltage converter 100. Therefore, the latch 112 can maintain the output of the load check circuit 101 between sampling times of the peak current and corresponding comparison of the actual peak current to the load level threshold.

Figure 2:
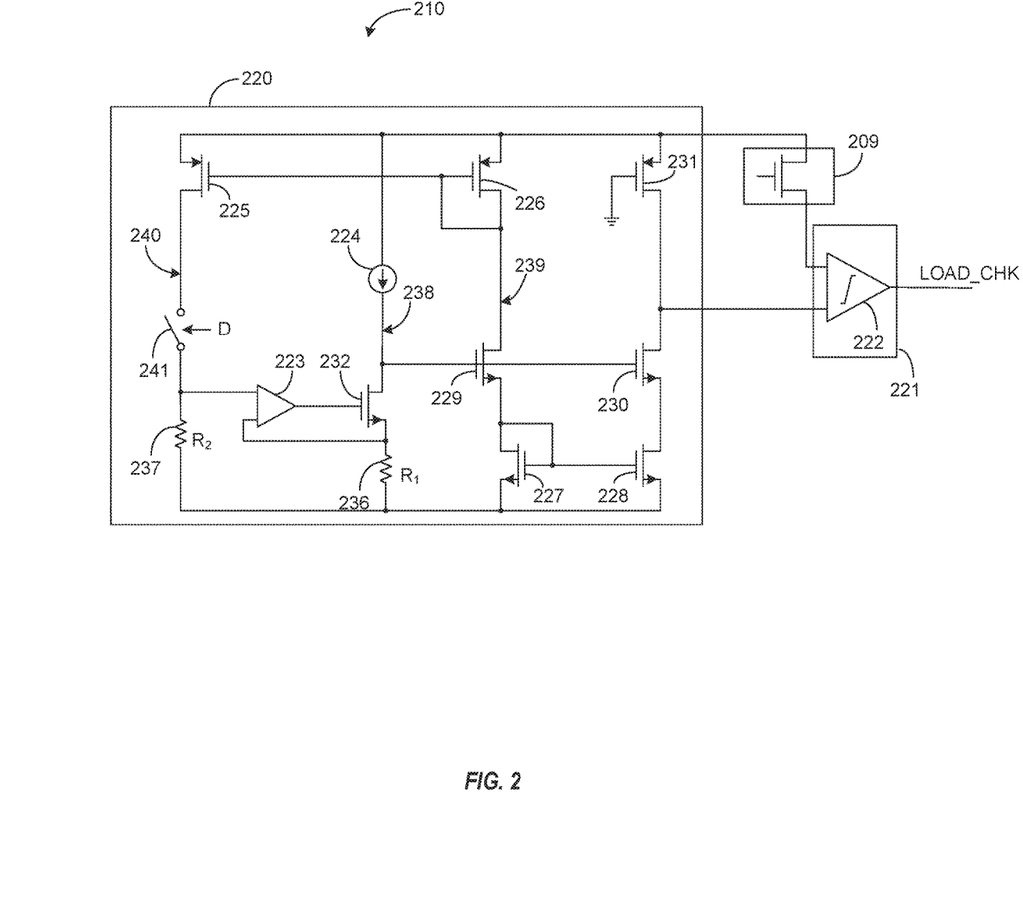
FIG. 2 illustrates generally an example threshold generator circuit.

FIG. 2 illustrates generally an example threshold generator circuit 210. In certain examples, the threshold generator circuit 210 can include a threshold generator 220 and a comparator circuit 221. The comparator circuit 221 can receive a representation of the current passing through the first power switch, the load current ($I_{S1}$) and a representation of a minimum DCM threshold ($I_{DCM\_TH}$) provided by the threshold generator 220. A comparator 222 of the comparator circuit 221 can compare the relative values of the load current and the minimum DCM threshold and can provide an indication of the comparison. In the illustrated example of FIG. 2, the output (LOAD_CHK) of the comparator 222 can transition from a low logic state to a high logic state when the peak load current ($I_{S1}$) transitions from below the minimum DCM threshold ($I_{DCM\_TH}$) to above the minimum DCM threshold ($I_{DCM\_TH}$). In certain examples, the comparator 222 can include hysteresis to reduce nuisance transitions of the comparator output (LOAD_CHK) when the inputs to the comparator 222 have levels that are very close to one another.

In certain examples, the threshold generator 220 can include an amplifier 223, a reference current source 224, various transistors 225-232, a first resistor ($R_1$) 236, and a second resistor ($R_2$) 237. A first branch 238 of the threshold generator 220 can include the reference current source 224, a first transistor 232 and the first resistor 236. The control node of the first transistor 232 can be coupled to the output of the amplifier 223. The first transistor 232 can pass the reference current ($I_{ref}$) of the reference current source 224 to the first resistor ($R_1$) 236. A node of the first resistor ($R_1$) 236 can be coupled to a first input of the amplifier 223. The voltage at the first input of the amplifier 223 can be about $I_{ref}*R_1$.

As the output of the amplifier 223 varies, the output current ($I_{out}$) of a second branch 239 of the threshold generator 220 can also vary using a second transistor 229 having a control node coupled to a switch terminal of the first transistor 232. The output current ($I_{out}$) can be mirrored to a third branch 240, or feedback path, of the threshold generator 220 using transistors 226, 227 of a first current mirror and can be passed through a second resistor ($R_2$) 237 as a function of a duty cycle (D) of the power converter. The duty cycle (D) can be implemented in the third branch 240 as a duty-cycle switch 241 that can interrupt current flow to the second resistor ($R_2$) 237 based on the duty cycle (D). A node of the second resistor 237 can be coupled to a second input of the amplifier 223. The voltage at the second input of the amplifier 223 can be equal to $I_{out}*D*R_2$. In certain examples, the output current ($I_{out}$) is mirrored in a fourth branch 242 using transistors 227, 228 of a second current mirror so as to be applied to an input of the comparator circuit 221, thus, the output current ($I_{out}$) can be the minimum DCM threshold ($I_{DCM\_TH}$) or, $$I_{DCM\_TH}=I_{out} \qquad \text{Eq. 2}$$

The amplifier will work to make the voltages at the first and second inputs the same such that, $$R_2DI_{out}=I_{ref}R_1. \qquad \text{Eq. 3}$$

By substitution via Eq. 1, $$R_2DI_{DCM\_TH}=I_{ref}R_1. \qquad \text{Eq. 4}$$

Solving for $I_{DCM\_TH}$ gives, $$I_{DCM\_TH} = \frac{I_{ref}R_1}{DR_2}. \qquad \text{Eq. 5}$$

In certain examples, the representation of the power switch current can be a scaled version of the actual power switch current, for example, scaled by a factor of K via the current sensor 209. Thus, the output current ($I_{out}$) can represent a scaled version of the actual peak threshold current such that, $$\frac{I_{DCM\_TH}}{K} = I_{out}. \qquad \text{Eq. 6}$$

Therefore, the actual minimum DCM threshold current can be:

$$I_{DCM\_TH} = \frac{KI_{ref}R_1}{DR_2}. \qquad \text{Eq. 7}$$

Just like Eq. 1, Eq. 7 is inversely proportional to the switching duty cycle. Therefore, the minimum DCM threshold cam represent a minimum load on the switching voltage converter. Providing an indication of whether the switching converter is above or below the minimum load can allow the switching converter to selective operate according to a more efficient switching scheme. In certain examples, the reference current source 224 can be adjustable to allow fine tuning of the minimum DCM threshold, or the minimum load level. In certain examples, the fourth branch can include an optional bias transistor 231 to mirror the voltage drop of the current sensor 209.

Figure 3A:
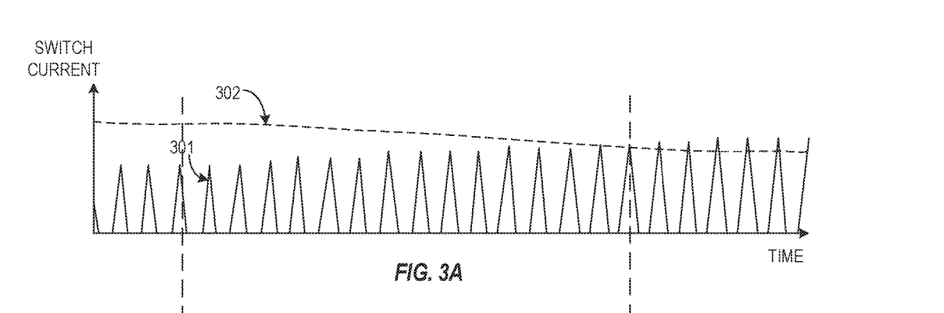
FIG. 3A-3C illustrates generally example waveforms for generating a command signal for switching to DCM operation after a load of a regulator has transitioned thru a minimum DCM threshold from a low load level to a higher load level.
Figure 3B:
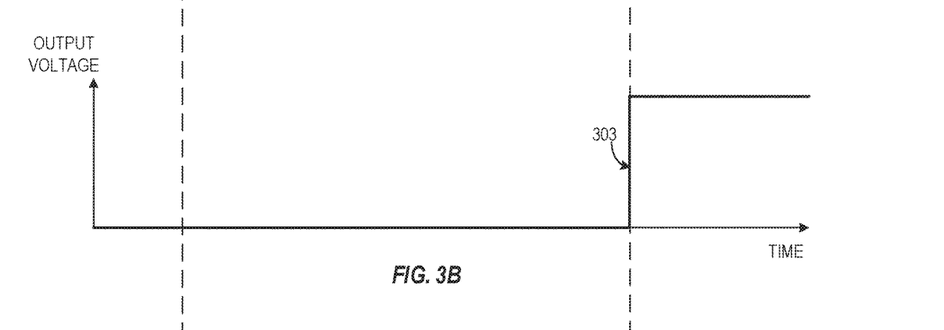
Figure 3C:
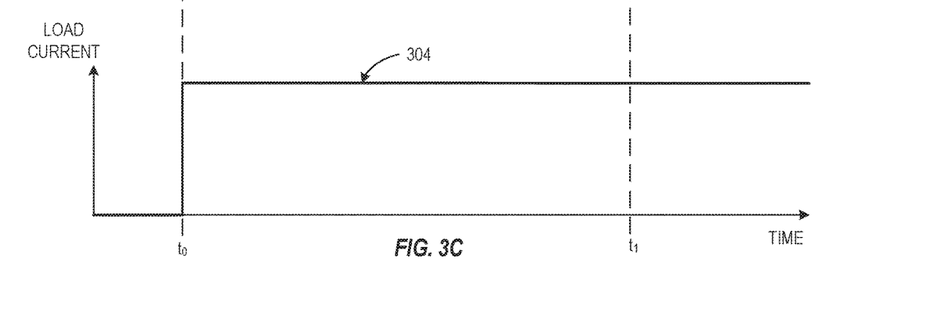

FIG. 3A-3B illustrates generally example waveforms for generating a command signal for switching to DCM operation after a load of a regulator has transitioned thru a minimum DCM threshold from a low load level to a higher load level. FIG. 3A shows a representation of sensed current 301 from a switching voltage converter and the corresponding minimum DCM threshold 302 generated by an example threshold generator as discussed above. FIG. 3B shows the logic voltage level 303 of an output of the load check circuit comparator. FIG. 3C shows a representation of the load current 304 of the load device. At t0, the current load increases significantly. After the current load increases at t0, the duty cycle of the current waveform of FIG. 3A begins to increase and, as predicted by the equations above, the minimum DCM threshold begins to decrease. At t1, the peak current of the representation of the sensed current begins to exceed the minimum DCM threshold and the output of the load check circuit changes states indicating that the voltage converter control can switch to DCM mode to be more efficient. It is understood that as the load current decreases, and the peak current of the representation of the sensed current falls below the minimum DCM threshold, the output of the load check circuit can change states, for example to a low logic level, to indicate that another form of power switch control may be more efficient than maintaining DCM control under such light load conditions.

Figure 4:
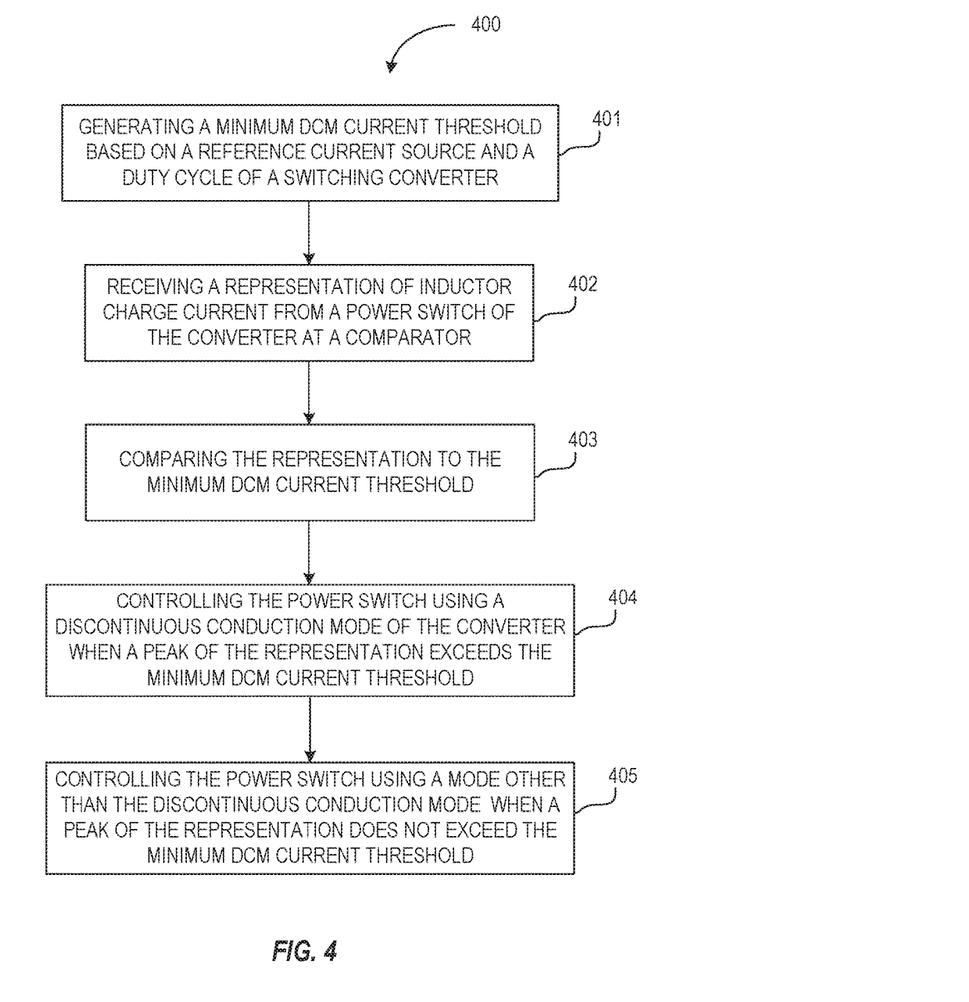
FIG. 4 illustrates generally a flowchart of an example method 400 for adjusting a control scheme of a switching converter such as a dc-dc switching converter.

FIG. 4 illustrates generally a flowchart of an example method 400 for adjusting a control scheme of a switching converter such as a dc-dc switching converter. At 401, a threshold generator of a load check circuit of the switching converter can generate a minimum DCM threshold. As discussed above, the minimum DCM threshold can be based on an output of a reference current source and a duty cycle of the switching converter. At 402, a comparator of the load check circuit can receive a representation of inductor charge current from a current sensor coupled to or associated with a power switch of the switching converter. At 403, the comparator can compare the representation with the minimum DCM threshold and can provide an indication of the comparison. In certain examples, the output of the comparator can be latched. At 404, when the peak value of the representation exceeds the minimum DCM threshold, the converter can switch to or maintain controlling the power switches of the switching converter according to a DCM control scheme. In certain examples, at 405, when the peak value of the representation does not exceed the minimum DCM threshold, the converter can switch to a more efficient control scheme or mode for controlling the power switches other than the DCM, such as a hysteresis control scheme.

Providing a load-check circuit and method as discussed above can provide a more accurate and faster method of determining a load level of the switching converter. In addition, the load check function is independent of the inductance of the switching converter and is independent of input and output conditions of the switching converter. Apparatus according to the present subject matter is easy to realize even in very fast switching converters. A load check circuit a discussed above can be employed in buck type switching converters, boost type switching converters, and buck-boost type switching converters. A duty cycle associated with a different signal may be needed depending on the type of switching converter. In certain examples, the load check circuit can use the same hardware as a current limit circuit normally provided in a switching converter. The response time of the load check circuit is much lower than the switching frequency of the converter and is may only be limited by the DCM loop bandwidth.

VARIOUS NOTES & EXAMPLES

In Aspect 1, a method for real-time load current detection for a switching converter using a discontinuous conduction mode (DCM) of operation can include generating a minimum DCM current threshold based on an reference current source and a duty cycle of the switching converter, receiving a representation of inductor charge current from power switch of the switching converter at a comparator, comparing the representation to the DCM current threshold, and controlling the power switch using a discontinuous conduction mode of the switching converter when a peak of the representation exceeds the minimum DCM current threshold.

In Aspect 2, the method of Aspect 1 optionally switching from the discontinuous conduction mode of operation of the converter when the representation does not exceed the minimum DCM current threshold.

In Aspect 3, the generating the minimum DCM current threshold of any one or more of Aspects 1-2 optionally includes mirroring the minimum DCM current threshold via a feedback path, the feedback path including a feedback resistor and a duty-cycle switch configured to operate according to a duty cycle (D) of the converter.

In Aspect 4, the method of any one or more of Aspects 1-3 optionally includes comparing a feedback voltage across the feedback resistor to a reference voltage across a reference resistor to provide a minimum DCM current control signal.

In Aspect 5, the comparing the feedback voltage to a reference voltage of any one or more of Aspects 1-4 optionally includes providing a reference current to the reference resistor from the reference current source.

In Aspect 6, the receiving the representation of an inductor charge current of any one or more of Aspects 1-5 optionally includes scaling the inductor current by a factor of K using a current sensor.

In Aspect 7, the generating the minimum DCM current threshold (Ith) of any one or more of Aspects 1-6 optionally includes setting the minimum DCM current threshold as a function of the reference current (Iref) provided by the adjustable current source such that, $I\_th=(I\_ref*R2)/DR1$.

In Aspect 8, a circuit for changing an operating mode of a discontinuous conduction mode voltage converter can include a first comparator configured to compare a representation of a contemporaneous current load of the voltage converter with a minimum DCM current threshold, and to provide an output signal indicative of the comparison, and a threshold generator circuit configured to provide the minimum DCM current threshold based on a reference current and a duty cycle of the converter.

In Aspect 9, the first comparator of any one or more of Aspects 1-8 optionally is configured to receive a scaled representation of an inductor current of the converter from a current sensor associated with a power switch of the converter, the scaled representation having a scale factor of K.

In Aspect 10, the threshold generator circuit of any one or more of Aspects 1-9 optionally includes a first current mirror configured to provide the minimum DCM current threshold to a second input of the comparator.

In Aspect 11, the threshold generator circuit of any one or more of Aspects 1-10 optionally includes a second current mirror configured to feedback a representation of the minimum DCM current threshold to a feedback path of the threshold generator.

In Aspect 12, the feedback path of any one or more of Aspects 1-11 optionally includes a switch configured to operate according to a duty cycle of the converter and a feedback resistor coupled to the switch and configured to provide a feedback voltage.

In Aspect 13, the threshold generator circuit of any one or more of Aspects 1-12 optionally includes a second comparator configured to compare the feedback voltage with a reference voltage and to provide a DCM threshold current control signal.

In Aspect 14, the threshold generator circuit of any one or more of Aspects 1-13 optionally includes a reference current source configured to provide the reference current and a reference resistor configured to provide a reference voltage using the reference current.

In Aspect 15, the threshold generator circuit of any one or more of Aspects 1-14 optionally includes an output transistor configure to receive the DCM threshold current control signal and to generate the minimum DCM current threshold.

In Aspect 16, a switching converter can include an input configured to receive and input voltage, an output configured to provide an output voltage to a load, a power switch coupled to the input, an inductor coupled to the output, wherein the power switch and the inductor are coupled in series with each other between the input and the output, a current sensor configured to provide a representation of current passing through the power switch, and a control circuit configured to control the power switch in one of a plurality of modes. The control circuit can include a threshold generator circuit configured to provide a minimum DCM threshold based on a reference current and a duty cycle of the power switch of the switching converter, and a first comparator configured to compare the representation with the minimum DCM threshold, and to provide an output signal indicative of the comparison. The control circuit can control the power switch in a discontinuous current mode of the plurality of modes when the representation exceeds the minimum DCM threshold.

In Aspect 17, the control circuit of any one or more of Aspects 1-16 optionally is configured to receive a scaled representation of an inductor current of the converter from the current sensor, the scaled representation having a scale factor of K.

In Aspect 18, the threshold generator circuit of any one or more of Aspects 1-17 optionally includes a first current mirror configured to provide the minimum DCM threshold to a second input of the comparator, and a second current mirror configured to feedback a representation of the minimum DCM threshold to a feedback path of the threshold generator.

In Aspect 19, the feedback path of any one or more of Aspects 1-18 optionally includes a switch configured to operate according to a duty cycle of the converter and a feedback resistor coupled to the switch and configured to provide a feedback voltage.

In Aspect 20, the threshold generator circuit of any one or more of Aspects 1-19 optionally includes a second comparator configured to compare the feedback voltage with a reference voltage and to provide a DCM threshold current control signal, and a reference current source configured to generate the reference voltage in cooperation with a second resistor.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed The claimed invention is:

1. A method for real-time load current detection for a switching converter using a discontinuous conduction mode (DCM) of operation, the method comprising:
generating a minimum DCM current threshold based on an reference current source and a duty cycle of the switching converter;
receiving a representation of inductor charge current from power switch of the switching converter at a comparator;
comparing the representation to the DCM current threshold; and
controlling the power switch using a discontinuous conduction mode of the switching converter when a peak of the representation exceeds the minimum DCM current threshold.

2. The method of claim 1, including switching from the discontinuous conduction mode of operation of the converter when the representation does not exceed the minimum DCM current threshold.

3. The method of claim 1, wherein the generating the minimum DCM current threshold includes mirroring the minimum DCM current threshold via a feedback path, the feedback path including a feedback resistor and a duty-cycle switch configured to operate according to a duty cycle (D) of the converter.

4. The method of claim 3, including comparing a feedback voltage across the feedback resistor to a reference voltage across a reference resistor to provide a minimum DCM current control signal.

5. The method of claim 4, wherein the comparing the feedback voltage to a reference voltage includes providing a reference current to the reference resistor from the reference current source.

6. The method of claim 5, wherein the receiving the representation of an inductor charge current includes scaling the inductor current by a factor of K using a current sensor.

7. The method of claim 4, wherein generating the minimum DCM current threshold ($I_{th}$) includes setting the minimum DCM current threshold as a function of the reference current ($I_{ref}$) provided by the adjustable current source such that, $$I_{th} = \frac{I_{ref} * R2}{DR1}.$$

8. A circuit for changing an operating mode of a discontinuous conduction mode voltage converter, the circuit comprising:
a first comparator configured to compare a representation of a contemporaneous current load of the voltage converter with a minimum DCM current threshold, and to provide an output signal indicative of the comparison; and
a threshold generator circuit configured to provide the minimum DCM current threshold based on a reference current and a duty cycle of the converter.

9. The circuit of claim 8, wherein the first comparator is configured to receive a scaled representation of an inductor current of the converter from a current sensor associated with a power switch of the converter, the scaled representation having a scale factor of K.

10. The circuit of claim 9, wherein the threshold generator circuit includes a first current mirror configured to provide the minimum DCM current threshold to a second input of the comparator.

11. The circuit of claim 10, wherein the threshold generator circuit includes a second current mirror configured to feedback a representation of the minimum DCM current threshold to a feedback path of the threshold generator.

12. The circuit of claim 11, wherein the feedback path includes a switch configured to operate according to a duty cycle of the converter and a feedback resistor coupled to the switch and configured to provide a feedback voltage.

13. The circuit of claim 12, wherein the threshold generator circuit includes a second comparator configured to compare the feedback voltage with a reference voltage and to provide a DCM threshold current control signal.

14. The circuit of claim 13, wherein the threshold generator circuit includes a reference current source configured to provide the reference current and a reference resistor configured to provide a reference voltage using the reference current.

15. The circuit of claim 13, wherein the threshold generator circuit includes an output transistor configure to receive the DCM threshold current control signal and to generate the minimum DCM current threshold.

16. A switching converter comprising:
an input configured to receive and input voltage;
an output configured to provide an output voltage to a load;
a power switch coupled to the input;
an inductor coupled to the output, wherein the power switch and the inductor are coupled in series with each other between the input and the output;
a current sensor configured to provide a representation of current passing through the power switch; and
a control circuit configured to control the power switch in one of a plurality of modes;
wherein the control circuit includes:
a threshold generator circuit configured to provide a minimum DCM threshold based on a reference current and a duty cycle of the power switch of the switching converter; and
a first comparator configured to compare the representation with the minimum DCM threshold, and to provide an output signal indicative of the comparison; and
wherein the control circuit controls the power switch in a discontinuous current mode of the plurality of modes when the representation exceeds the minimum DCM threshold.

17. The switching converter of claim 16, wherein the control circuit is configured to receive a scaled representation of an inductor current of the converter from the current sensor, the scaled representation having a scale factor of K.

18. The switching converter of claim 17, wherein the threshold generator circuit includes:

a first current mirror configured to provide the minimum DCM threshold to a second input of the comparator; and a second current mirror configured to feedback a representation of the minimum DCM threshold to a feedback path of the threshold generator.

19. The switching converter of claim 17, wherein the feedback path includes a switch configured to operate according to a duty cycle of the converter and a feedback resistor coupled to the switch and configured to provide a feedback voltage.

20. The switching converter of claim 19, wherein the threshold generator circuit includes:

a second comparator configured to compare the feedback voltage with a reference voltage and to provide a DCM threshold current control signal; and a reference current source configured to generate the reference voltage in cooperation with a second resistor.

* * * * *